3,243,310
STABILIZED POLYETHYLENE WAXES AND
PROCESS FOR PREPARING SAME
David C. Hull and Raymond L. Etter, Jr., Longview,
Tex., assignors to Eastman Kodak Company, Rochester,
N.Y., a corporation of New Jersey
No Drawing. Filed July 27, 1961, Ser. No. 127,108
11 Claims. (Cl. 106—270)

This invention relates to novel emulsifiable polyethylene wax compositions and their process of preparation. More particularly, this invention relates to emulsifiable polyethylene waxes that are stabilized against viscosity changes. In a specific aspect, this invention relates to emulsifiable polyethylene waxes that are stabilized against viscosity changes by the incorporation of a stabilizing amount of an aliphatic alcohol, as hereinafter described.

In recent years, water emulsifiable, self-polishing polyethylene waxes have become available commercially. These polyethylene waxes are 100% emulsifiable in water, have a molecular weight in the range of about 1,000 to about 6,000, and are characterized by the ability to form tough, flexible, non-tacky and highly water resistant coatings. These water emulsifiable waxes can be prepared by thermally degrading a plastic-grade polyethylene having a molecular weight of from about 10,000 to about 30,000 to a molecular weight of from 1,000 to about 6,000, preferably from about 1,500 to about 4,500, and then oxidizing at a temperature from about 100° C. to about 250° C. and preferably at 120° C. to 140° C. The acid numbers of the emulsifiable waxes obtained in this manner vary from about 4 to about 25 and optimum properties are usually obtained at an acid number in the range of about 8 to about 16. The oxidation can be initiated by organic peroxides or hydroperoxides such as tert. butyl peroxide, tert. butyl hydroperoxide, benzoyl peroxide, cumene hydroperoxide and the like. Because of their excellent properties, commercial availability, constant quality and inexpensive character, the emulsifiable polyethylene waxes are excellent substitutes for carnauba wax which is available in limited quantities and then, only at relatively high cost. However, these emulsifiable polyethylene waxes are subject to changes in viscosity, due to cross-linking, which results in decreasing emulsifiability, and ultimately, in products that set up to a solid mass. It is evident, therefore, that water emulsifiable polyethylene waxes stabilized against viscosity changes and a process for their preparation will greatly enhance the art.

Accordingly, it is an object of this invention to provide novel water emulsifiable polyethylene wax compositions.

Another object of this invention is to provide water emulsifiable polyethylene waxes that are stabilized against viscosity changes.

Another object of this invention is to provide emulsifiable polyethylene waxes that are stabilized against viscosity changes employing relatively inexpensive and commercially available materials.

Still another object of this invention is to provide a process for stabilizing emulsifiable polyethylene waxes against viscosity changes by incorporating one or more aliphatic alcohols therein.

Other objects will become apparent from an examination of the specification and claims which follow.

In accordance with the invention, it has been found that water emulsifiable polyethylene waxes can be stabilized against changes in viscosity, without adversely affecting their physical properties, by incorporating therein an aliphatic alcohol, as hereinafter described.

Any of the known polyethylene waxes that are emulsifiable in water can be employed in the practice of this invention. As already indicated, emulsifiable polyethylene waxes can be prepared by thermally degrading a plastic-grade polyethylene and then oxidizing to form a wax which is 100% emulsifiable in water. These waxes are characterized by their ability to form tough, flexible, non-tacky, highly water resistant coatings and exhibit molecular weights in the range of about 1,000 to about 6,000 and more preferably in the range of about 1,500 to about 4,500.

The Staudinger system of determining molecular weights is intended when reference is made to molecular weights herein. More particularly, the molecular weights of the polymers are calculated from inherent viscosity of a dilute solution of a polyethylene. The viscosity of a dilute solution of a polyethylene has been shown to be related to the known average molecular weight, $<M_N>$ according to the following formula:

$$(\eta) = 2.21 \times 10^{-3} (<M_N>)0.60$$

The inherent viscosity $(\eta)$ is determined using a 0.25% tetralin solution of the polymer at 100° C.

$$(\eta) = \frac{L n n r}{C}$$

wherein $$\eta_r = \frac{\text{Flow time of solution}}{\text{Flow time of solvent}}$$

The concentration in grams per 100 ml. is denoted by C.

In addition to having molecular weights in the range of about 1,000 to about 6,000, the emulsifiable polyethylene waxes are also characterized by a ring and ball softening point (ASTM D36–26) in the range of about 90° to about 112° C., and preferably in the range of about 104° to about 111° C., an acid number in the range of about 4 to about 25 and preferably in the range of about 8 to about 16 and a density in the range of about 0.90 to about 0.97, the most preferred waxes having a density in the range of about 0.938 to about 0.956 (ASTM D1505–57–T).

In practicing this invention any one or mixtures of primary aliphatic monohydric alcohols containing 4 to 20 carbon atoms are effective to stabilize water emulsifiable polyethylene waxes against changes in viscosity. However, a prime consideration in choosing an alcohol for this purpose is its compatibility with the emulsifiable polyethylene wax. For example, the primary aliphatic monohydric alcohols containing less than 12 carbon atoms, while affording a high degree of stabilization, are deficient as wholly desirable additives due to either some degree of incompatibility or volatility and odor. In contrast, the high molecular weight primary aliphatic monohydric alcohols, particularly, those containing 18 carbon atoms, are extremely compatible with emulsifiable polyethylene waxes and are almost odorless. It should be understood, however, that any of the primary aliphatic monohydric alcohols containing 4 to 20 carbon atoms can be employed to effectively inhibit viscosity changes in emulsifiable polyethylene waxes according to this invention. The term "aliphatic," when used in the specification and claims, is intended to include alcohols which contain only carbon, hydrogen and oxygen, are saturated or unsaturated, straight or branched chain alcohols as exemplified by isobutyl, amyl, octyl, nonyl, decyl, lauryl, 2,2-dimethyl dodecanol, 2,2-dimethyl tetradecanol, cetyl, stearyl, nonadecyl, eicosyl, pentenyl, nonenyl, decenyl, undecenyl, hexadecenyl, oleyl and the like.

The compositions of this invention can be prepared by any method suitable for ensuring a uniform mixture of polymer with the primary aliphatic monohydric alcohol in the final product. For example, the emulsifiable polyethylene wax can be placed in a vessel with the desired amount of alcohol and the wax melted and agitated until the alcohol is well dispersed therein. The wax can then be pelleted or solidified and cut in a conventional manner. A significant feature of this invention is that the addition of alcohol can take place at almost any point in the manufacture of the wax. Thus, the alcohol can be added after the plastic-grade polyethylene is degraded, but before oxidation, which prevents any viscosity increases during the oxidation step as well as in later processing operations. An additional advantage is gained from the addition of the alcohol prior to the oxidation step in that the oxidation is accelerated somewhat, as shown by Example 7. This acceleration allows lower temperatures and pressures to be used in the oxidation procedure. In general, as little as 1%, by weight, of the alcohol, based on the polyethylene wax, will inhibit changes in viscosity. However, where a higher degree of stability is desired percentages of at least 5% should be employed. It is preferred, however, that percentages in the range of about 6 to about 12% be employed although percentages up to and including 25% give excellent results. More than 25%, by weight, of the alcohol can be incorporated into the emulsifiable polyethylene wax but no particular advantages are derived therefrom.

A very significant feature of this invention is that the primary aliphatic alcohols disclosed herein can be incorporated into polyethylene waxes to inhibit changes in viscosity without adversely affecting the properties of the wax. In addition, these alcohols are relatively inexpensive and commercially available materials. Furthermore, small amounts of other additives can be incorporated into the emulsifiable polyethylene wax compositions of this invention. Such additives include, for example, high melting waxes, stabilizers and the like, provided these materials are not present in a sufficient amount to adversely affect the properties of the composition.

This invention can be further illustrated by the following examples of preferred embodiments thereof although it will be understood that these examples are included merely for purposes of illustration and are not intended to limit the scope of the invention unless otherwise specifically indicated.

*Example 1*

As already indicated, primary aliphatic monohydric alcohols containing 4 to 20 carbon atoms effectively inhibit viscosity changes in an emulsifiable polyethylene wax without detrimentally affecting its properties. To illustrate, 188 g. of an emulsifiable polyethylene wax having a molecular weight of 1500 and a density of 0.939 is placed in a 500 ml. round-bottom flask immersed in an oil bath at 150° C. The wax is melted and 12 g. (6%, by weight) of cetyl alcohol is added to the flask. The wax and alcohol mixture is stirred for about ten minutes, after which it is poured into a pan and cut. No exudation of the alcohol to the surface of the wax occurs, indicating complete compatibility. The more important physical properties of the emulsifiable polyethylene wax, both before and after incorporation of the cetyl alcohol, are set forth below. Upon an examination of the following table it can be seen that the incorporation of the alcohol does not detrimentally affect the properties of the wax.

|  | Wax | Wax plus Alcohol |
|---|---|---|
| Color (Gardner Scale) | 1 | 1 |
| Acid Number | 13.1 | 13.0 |
| Ring and Ball Softening Point (ASTM D36-26) | 110 | 105.3 |
| Penetration Hardness, mm. at 73° C. (ASTM D5-52) | 2.5 | 2.3 |
| Brookfield Viscosity, cp. at 125° C | 420 | 420 |
| Emulsifiability | Pass | Pass |

Samples of the above alcohol containing wax and the same wax containing no alcohol are placed in test tubes and immersed in an oil bath at 150° C. The viscosities of these two samples are made at 24 hours intervals. The results of these viscosity measurements are set forth below.

| Sample | Viscosity (cps.) at 150° C. after— | | | | | | | | | |
|---|---|---|---|---|---|---|---|---|---|---|
|  | 0 days | 1 day | 2 days | 3 days | 4 days | 5 days | 6 days | 7 days | 8 days | 9 days |
| Wax | 405 | 4,500 | (1) | | | | | | | |
| Wax plus Cetyl Alcohol | 400 | 430 | 590 | 690 | 800 | 1,475 | 1,500 | 3,050 | 5,000 | (1) |

1 Set Up.

*Example 2*

The procedure of Example 1 is repeated using 6%, by weight, 2,2-dimethyl tetradecanol in place of cetyl alcohol. Again, no exudation of the alcohol to the surface of the wax occurs and the odor is improved.

|  | Wax | Wax plus Alcohol |
|---|---|---|
| Color (Gardner Scale) | 1 | 1 |
| Acid Number | 13.1 | 13.6 |
| Ring and Ball Softening Point (ASTM D36-26) | 110 | 109 |
| Penetration Hardness, mm. at 73° C. (ASTM D5-52) | 2.5 | 2.6 |
| Brookfield Viscosity, cp. at 125° C | 420 | 408 |
| Emulsifiability | Pass | Pass |

A viscosity study on the wax is made as in Example 1 and the results set forth below.

| Sample | Viscosity (cps.) at 150° C. after— | | | | | | |
|---|---|---|---|---|---|---|---|
|  | 0 days | 1 day | 3 days | 4 days | 5 days | 10 days | 11 days |
| Wax | 390 | (1) | | | | | |
| Wax plus 2,2-dimethyl tetradecanol | 370 | (2) | 900 | 1,200 | 1,840 | 3,440 | 3,530 |

1 Set Up.
2 Not taken.

*Example 3*

The procedure of Example 2 is repeated except that the amount of 2,2-dimethyl tetradecanol is increased to 12%, by weight, based on the wax. A viscosity study is made as in the preceding examples, and the results set forth below.

| Sample | Viscosity (cps.) at 150° C. after— | | | | | | | |
|---|---|---|---|---|---|---|---|---|
| | 0 days | 1 day | 3 days | 4 days | 5 days | 9 days | 10 days | 11 days |
| Wax | 390 | (¹) | | | | | | |
| Wax plus 2,2-dimethyl tetradecanol | 360 | 400 | 460 | 520 | 620 | 960 | 1,600 | 1,800 |

¹ Set Up.

*Example 4*

The procedure of Example 2 is repeated using an emulsifiable polyethylene wax having a molecular weight of 1500 and a density of 0.956. A viscosity study is made and the following results are obtained.

| Sample | Viscosity (cps.) at 150° C. after— | | | | | | | | |
|---|---|---|---|---|---|---|---|---|---|
| | 0 days | 1 day | 2 days | 3 days | 4 days | 5 days | 6 days | 7 days | 8 days |
| Wax | 386 | 657 | 1,200 | 2,580 | (¹) | | | | |
| Wax plus 2,2-dimethyl tetradecanol | 360 | 373 | 430 | 452 | 675 | 720 | 1,000 | 1,225 | 1,960 |

¹ Set Up.

*Example 5*

The procedure of Example 1 is repeated using 6%, by weight, of stearyl alcohol. The physical properties before and after the addition of the alcohol are the same as those set forth in Example 1 except that the acid number of the wax alcohol composition is 13.6 rather than 13.0. A viscosity study on the wax is made as in the preceding examples, and the results set forth below.

| Sample | Viscosity (cps.) at 150° C. after— | | | | | | | |
|---|---|---|---|---|---|---|---|---|
| | 0 days | 1 day | 2 days | 3 days | 5 days | 6 days | 7 days | 8 days |
| Wax | 400 | 1,560 | (¹) | | | | | |
| Wax plus Stearyl Alcohol | 300 | 400 | 440 | 555 | 880 | 1,160 | 1,220 | 1,325 |

¹ Set Up.

*Example 6*

As shown by Examples 1–5, the primary aliphatic monohydric alcohol can be a saturated straight or branch chain alcohol containing 4 to 20 carbon atoms. In addition, excellent results are obtained with unsaturated alcohols containing 4 to 20 carbon atoms. Thus, Example 1 is repeated using 6%, by weight, of oleyl alcohol. A viscosity study is made in the preceding examples, and the results set forth below.

| Sample | Viscosity (cps.) at 150° C. after— | | | | | | | |
|---|---|---|---|---|---|---|---|---|
| | 0 days | 1 day | 2 days | 3 days | 4 days | 5 days | 6 days | 7 days |
| Wax | 440 | (¹) | | | | | | |
| Wax plus Oleyl Alcohol | 370 | 490 | 530 | 840 | 1,000 | 1,200 | 1,930 | 2,000 |

¹ Set Up.

*Example 7*

As already pointed out hereinabove, it as advantageous to incorporate the alcohol in the wax during the preparation of the latter. A convenient place to effect such an addition is prior to the oxidation step. To illustrate, 200 g. of a degraded non-emulsifiable polyethylene wax having a molecular weight of approximately 1500 and a density of 0.925 is placed in a 500 ml. round-bottom flask fitted with stirrer, gas inlet tube and outlet to a bubbler. The flask is placed in a 150° C. oil bath and oxygen is introduced below the surface of the molten wax while the mixture is agitated. The rate of oxidation is shown by an examination of the acid numbers, taken at 1 or 2 hour intervals, as follows:

Sample after:                                                 Acid No.
1 hour _____ 1.5
3 hours _____ 4.0
5 hours _____ 8.9
6 hours _____ 11.2
7 hours _____ 15.2

The oxidation is stopped and the material obtained is placed in an oil bath at 150° C. for viscosity study. The initial viscosity is 340 cp. and the wax sets up to a solid mass within 24 hours.

The above run is repeated with the addition of 6%, by weight, of stearyl alcohol to the wax prior to oxidation. The oxidation proceeds at a more rapid rate as shown by the following table setting forth the acid numbers taken at one or 2 hour intervals.

Sample after:                                                 Acid No.
1 hour _____ 1.1
2 hours _____ 2.5
3 hours _____ 5.2
5 hours _____ 16.2

A viscosity study is made on the oxidized emulsifiable polyethylene wax containing 6% stearyl alcohol and the results set forth below.

| Sample | Viscosity (cps.) at 150° C. after— | | | | | |
|---|---|---|---|---|---|---|
| | 0 days | 1 day | 2 days | 3 days | 4 days | 5 days |
| Wax oxidized in presence of stearyl alcohol | 328 | 395 | 830 | 1,250 | 1,325 | 1,500 |

Thus, this invention provides the art with a simple and expedient process for the stabilization of emulsifiable polyethylene waxes against viscosity changes without adversely affecting the other valuable properties of the emulsifiable wax. In addition, there is provided an emulsifiable wax which is stabilized against viscosity changes and which can be used as a substitute for any of the conventional emulsifiable polyethylene waxes. These emulsifiable polyethylene wax compositions form excellent substitutes for carnauba wax, but are superior thereto in that they are substantially tougher and more flexible. They will disperse to form a 100% emulsifiable self-polishing wax and take an extremely high polish. These waxes are not brittle, either at moderate temperatures or at temperatures as low as 0° F., in which respect they are more desirable than carnauba wax for finishing leather and other flexible surfaces. Thus, at low temperatures the emulsifiable polyethylene waxes stabilized according to this invention are not subjected to cracks and loss of surface polish because of flakes or particles, scales or chips.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. A water emulsifiable polyethylene wax having a molecular weight of about 1,000 to about 6,000 prepared by thermal degradation and oxidation of polyethylene having a molecular weight of about 10,000 to about 30,000 being normally susceptible to changes in viscosity containing, in an amount sufficient to inhibit such changes, a primary aliphatic monohydric alcohol containing 4 to 20 carbon atoms.

2. A water emulsifiable polyethylene wax having a molecular weight of about 1,000 to about 6,000 prepared by thermal degradation and oxidation of polyethylene having a molecular weight of about 10,000 to about 30,000 being normally susceptible to changes in viscosity containing, in an amount sufficient to inhibit such changes, a primary aliphatic monohydric alcohol containing 12 to 20 carbon atoms.

3. A water emulsifiable polyethylene wax having a molecular weight in the range of about 1,000 to about 6,000 prepared by thermal degradation and oxidation of polyethylene having a molecular weight of about 10,000 to about 30,000, a density in the range of about 0.90 to about 0.97, a ring and ball softening point in the range of about 90° C. to about 112° C., an acid number in the range of about 4 to about 25 containing about 1 to about 25%, by weight, based on said wax, of a primary aliphatic monohydric alcohol containing 4 to 20 carbon atoms.

4. The composition of claim 3 in which the alcohol is a primary aliphatic monohydric alcohol containing 12 to 20 carbon atoms.

5. The composition of claim 3 in which the alcohol is cetyl alcohol.

6. The composition of claim 3 in which the alcohol is 2,2-dimethyl tetradecanol.

7. The composition of claim 3 in which the alcohol is stearyl alcohol.

8. The composition of claim 3 in which the alcohol is oleyl alcohol.

9. A method of inhibiting changes in viscosity in a water emulsifiable polyethylene wax having a molecular weight of about 1,000 to about 6,000 prepared by thermal degradation and oxidation of polyethylene having a molecular weight of about 10,000 to about 30,000 normally susceptible to such changes which comprises incorporating into said emulsifiable polyethylene wax, about 1 to about 25%, by weight, based on the wax, of a primary aliphatic monohydric alcohol containing 4 to 20 carbon atoms.

10. A method of inhibiting changes in viscosity in a water emulsifiable polyethylene wax normally susceptible to such changes which comprises incorporating into said emulsifiable polyethylene wax, about 1 to about 25%, by weight, based on the wax, of a primary aliphatic monohydric alcohol containing 12 to 20 carbon atoms.

11. The method of claim 10 wherein the alcohol is stearyl alcohol.

References Cited by the Examiner

UNITED STATES PATENTS

| | | | |
|---|---|---|---|
| 2,525,691 | 10/1950 | Lee et al. | |
| 2,683,141 | 7/1957 | Erchak | 260—94.9 |
| 2,885,293 | 5/1959 | Haskell et al. | 260—33.4 |
| 2,964,487 | 12/1960 | Chapman et al. | |

FOREIGN PATENTS 581,279  10/1946  Great Britain.

OTHER REFERENCES

Renfrew: Polythene, Illisffe, London, 1957 (pages 141 to 242 relied upon).

ALEXANDER H. BRODMERKEL, *Primary Examiner.*

MILTON STERMAN, MORRIS LIEBMAN, *Examiners.*

H. W. HAEUSSLER, J. CARSON, J. B. EVANS,
*Assistant Examiners.*